United States Patent [19]

Scharpf et al.

[11] Patent Number: 5,406,786
[45] Date of Patent: Apr. 18, 1995

[54] INTEGRATED AIR SEPARATION - GAS TURBINE ELECTRICAL GENERATION PROCESS

[75] Inventors: Eric W. Scharpf, Emmaus; Arthur R. Smith, Telford, both of Pa.

[73] Assignee: Air Products and Chemicals, Inc., Allentown, Pa.

[21] Appl. No.: 93,195

[22] Filed: Jul. 16, 1993

[51] Int. Cl.[6] ............................................. F02C 3/28
[52] U.S. Cl. ............................. 60/39.05; 60/39.12; 60/39.53
[58] Field of Search ............... 60/39.02, 39.05, 39.12, 60/39.511, 39.53, 39.59, 728

[56] References Cited

U.S. PATENT DOCUMENTS

| | | | |
|---|---|---|---|
| 3,731,495 | 5/1973 | Coveney | 62/39 |
| 3,783,614 | 1/1974 | Walker | 60/39.18 |
| 3,973,396 | 8/1976 | Kronogard | 60/39.66 |

(List continued on next page.)

FOREIGN PATENT DOCUMENTS 2067668  7/1981  United Kingdom .
2153912  8/1985  United Kingdom .

OTHER PUBLICATIONS

"A Comparison of Humid Air Turbine (HAT) Cycle and Combined-Cycle Power Plants"–1E–73–00–Research Project 2999–7–Final Report, Mar., 1991–EPRI.

Primary Examiner—Louis J. Casaregola
Attorney, Agent, or Firm—Willard Jones, II

[57] ABSTRACT

The present invention is related to an improvement for a process for the generation of electrical power, wherein, in a cryogenic air separation unit, compressed air is distilled into an oxygen product and a waste nitrogen product, wherein at least a portion of the oxygen product is compressed and reacted with a carbonaceous fuel, in a gasifier or partial oxidation unit, to produce a synthesis (fuel) gas comprising carbon monoxide and hydrogen, wherein feed air is compressed in a gas turbine feed air compressor and subsequently saturated; wherein the synthesis gas is combusted with the saturated, compressed, gas turbine feed air in a combustor to produce a combustion gas, which passes through a transition piece and is then expanded in a gas turbine to generate work, wherein at least a portion of the generated work is used to drive the gas turbine feed air compressor and wherein at least another portion of the generated work is used to generate electricity. The improvement is characterized by: (a) supplying at least a portion of the compressed air to the cryogenic air separation unit by withdrawing a portion of the compressed, gas turbine feed air from the gas turbine feed air compressor; and (b) utilizing at least a portion of the heat of compression of the oxygen product to heat water to saturate the compressed, gas turbine feed air. The improvement can be further characterized by feeding at least a portion of the waste nitrogen product to an intermediate stage of the gas turbine feed air compressor, or by injecting at least a portion of the waste nitrogen product as a controllable inert gas coolant, diluent or mass flow enhancing component into at least one piece of equipment selected from the group consisting of the combustor, the transition piece and the gas turbine, or by utilizing at least a portion of heat inherent to the withdrawn portion of the compressed, gas turbine feed air from the gas turbine feed air compressor being fed to the cryogenic air separation unit to warm the portion of the oxygen product fed to the gasifier or partial oxidation unit.

21 Claims, 8 Drawing Sheets

U.S. PATENT DOCUMENTS

| | | | |
|---|---|---|---|
| 4,019,314 | 4/1977 | Springmann | 60/39.02 |
| 4,224,045 | 9/1980 | Olszewski et al. | 62/30 |
| 4,297,842 | 11/1981 | Gerhold et al. | 60/39.06 |
| 4,314,442 | 2/1982 | Rice | 60/39.05 |
| 4,338,780 | 7/1982 | Sakamoto et al. | 60/39.05 |
| 4,537,023 | 8/1985 | Nakamura et al. | 60/39.05 |
| 4,557,735 | 12/1985 | Pike | 55/26 |
| 4,571,935 | 2/1986 | Rice | 60/39.05 |
| 4,631,914 | 12/1986 | Hines | 60/39.05 |
| 4,653,268 | 3/1987 | Nakamura et al. | 60/39.05 |
| 4,697,413 | 10/1987 | Pohl | 60/39.02 |
| 4,697,415 | 10/1987 | Schiffers | 60/39.12 |
| 4,707,994 | 11/1987 | Shenoy et al. | 62/11 |
| 4,829,763 | 5/1989 | Rao | 60/39.05 |
| 4,962,646 | 10/1990 | Rathbone | 62/24 |
| 5,036,672 | 8/1991 | Rottmann | 62/24 |
| 5,080,703 | 1/1992 | Rathbone | 62/38 |
| 5,081,845 | 1/1992 | Allam et al. | 62/24 |
| 5,095,693 | 3/1992 | Day | 60/39.05 |
| 5,160,096 | 11/1992 | Perkins et al. | 60/39.05 |
| 5,181,376 | 1/1993 | Rao | 60/39.05 |
| 5,241,816 | 9/1993 | Drnevich | 60/39.53 |
| 5,295,350 | 3/1994 | Child et al. | 60/728 |
| 5,295,351 | 3/1994 | Rathbone | 60/39.05 |

INTEGRATED AIR SEPARATION - GAS TURBINE ELECTRICAL GENERATION PROCESS

FIELD OF THE INVENTION

The present invention relates to a process for the integration of a cryogenic air separation unit with a unit for the production of electrical power using an integrated gasification humid air turbine (IGHAT) or an integrated gasification combined cycle (IGCC). More specifically, the present invention relates to an integration which reduces plant capital cost, increases the power output, and/or increases the efficiency at a fixed power output, and improves the operating flexibility of such electrical power generation process.

BACKGROUND OF THE INVENTION

For the purposes of this patent specification, a humid air turbine (HAT) cycle is defined to be a combustion turbine power generation cycle where the waste heat from the expander exhaust and/or any oxidant compressor inter/aftercooler is used to water saturate and superheat the oxidant stream before it is fed to the combustor.

The existing technology relating to integrated gasification humid air turbine and integrated gasification combined cycle power generation processes is disclosed in numerous scientific and patent references.

The background art discloses a general concept of supplying feed to an associated air separation unit by removing a portion of the compressed air from the gas turbine air compressor. U.S. Pat. No. 3,731,495 discloses a process in which the air separation unit feed is obtained from the gas turbine air compressor discharge at an elevated pressure, then cooled and further compressed to between 150 and 400 psia to feed the air separation unit. Similarly, U.S. Pat. No. 4,224,045 discloses a process in which some or all of the compressed air feed to the air separation unit is obtained from the discharge of the gas turbine air compressor at elevated pressure then optionally cooled and expanded or compressed so as to provide feed to the air separation unit at a pressure greater than 85 psia. Other references disclose a similar elevated pressure air extraction from the gas turbine air compressor discharge to different air separation unit cycles; these references include U.S. Pat. No. 5,081,845 and U.S. patent application No. 07/837,786. Finally, U.S. Pat. No. 4,631,914 discloses the extraction of intermediate pressure air from an intermediate stage of the gas turbine compressor of a combustion power generation cycle, however, the extracted air is fed to an intermediate stage in the expansion turbine to generate work and does not involve any integration with an air separation system.

The background art discloses a general concept of returning intermediate pressure waste nitrogen from an associated air separation unit to the gas turbine air compressor. U.K. Pat. No. (GB) 2,067,668 and U.S. Pat. No. 4,297,842 disclose a process which uses atmospheric pressure air separation unit waste nitrogen as a diluent to the oxidant air feed to the gas turbine compressor to reduce NOx generation downstream in the gas turbine combustor.

The background art relating to humid air turbine and humid air turbine-like cycles disclose a type of power plant to which the present invention is particularly applicable. U.S. Pat. No. 5,181,376 discloses a process that uses an oxidant air saturator to provide humid air to both a primary combustor/expansion turbine and a separate moist air expander or additional combustor/expansion turbine. U.S. Pat. No. 4,829,763 and U.K. (GB) 2,153,912 disclose a more definitive humid air turbine cycle with the heat of oxidant air compression recovered by an intercooler and an aftercooler associated with the gas turbine air compressor. U.S. Pat. No. 4,653,268 and U.S. Pat. No. 4,537,023 also disclose process systems where the heat of compression is recovered by water in an intercooler and aftercooler before being sent to an oxidant air saturator to provide humid air to the combustor/expansion turbine.

The background art discloses general concepts relating both to the cooling of the gas turbine combustor, transition piece, and expander and to the injection of waste nitrogen from an air separation unit to the combustor or as quench gas upstream of the gas turbine expander.

The following background ad disclose the use of air separation unit waste nitrogen in, and downstream of, the gas turbine combustor. U.S. Pat. No. 5,081,845 discloses "removing nitrogen gas from the air separation unit and boosting the pressure of at least a portion thereof to a pressure substantially equal to that of the fuel stream for introduction to the gas turbine between its [the gas turbine air] compressor discharge and expander inlet". Rathbone U.S. Pat. No. 4,962,646 discloses a system where, "a stream of nitrogen from the higher pressure rectification column [of the air separation unit] is supplied to one of the combustion chambers and the combustion products at a region upstream of the turbine". U.S. Pat. No. 4,707,994 discloses using, "nitrogen product [from the air separation unit] as secondary cooling gas for quenching of a combustor". U.S. Pat. No. 4,557,735 discloses "waste nitrogen sent to combustion zone" and "waste nitrogen sent to combustion gases prior to expansion through the gas turbine". U.S. Pat. No. 4,019,314 discloses "the improvement which comprises admixing the nitrogen produced during the air separation with the waste gases [combustor exhaust stream] before the expansion of the latter", "the nitrogen is admixed to the waste gases between . . . two expansion stages", and "waste gases are expanded in the first expansion stage to the pressure of the nitrogen leaving the air separation plant". Other background art describing similar use of the waste nitrogen include U.S. Pat. No. 5,080,703, U.S. Pat. No. 5,036,672, U.S. Pat. No. 4,697,415 and U.S. Pat. No. 4,697,413.

The key background art disclosing the integration of the air separation unit waste nitrogen with the hot combustion exhaust gases before expansion are U.S. Pat. No. 4,224,045 and U.S. Pat. No. 3,731,495. U.S. Pat. No. 4,224,045 discloses "compressing at least a portion of the nitrogen-rich gas . . . to pressure at least equal to the . . . ignition pressure, and flowing the compressed nitrogen-rich stream into the combustion stream, upstream of said power turbine [gas turbine expander]" and "at least part of said compressed nitrogen-rich stream is injected into the combustion stream after the . . . ignition". U.S. Pat. No. 3,731,495 discloses heating the air separation unit waste nitrogen, "by appropriate blanketing of the metal [combustion chamber] with nitrogen-rich quench gas, the nitrogen enriched gas temperature entering the expander may be as high as 1650 F" and "injecting relatively cool nitrogen-rich gas into said hot combustion gas in a separate quenching zone to form an intermediate temperature nitrogen-enriched gas mixture at super-atmospheric pressure".

The following background art relates to the cooling of the gas turbine combustor, transition piece, and expander. It should be noted that the simplest standard method for gas turbine expander cooling commonly practiced is diverting a portion of compressed air from the gas turbine air compressor to the combustor, transition piece, and first few stages of the gas turbine expander as flow-through coolant for the system. U.S. Pat. No. 5,160,096 discloses a humid air turbine cycle where humidified air is used as flow-through coolant for the first stationary vanes of the gas turbine expander while compressed air before humidification is used as flow-through coolant for the first stage rotor blades before mixing with the hot exhaust gas for further expansion. U.S. Pat. No. 5,095,693 discloses diverting a side stream from the outlet of the gas turbine compressor, removing some of its thermal energy by indirect heat exchange with the fuel stream, then providing it as a reduced temperature coolant for the gas turbine expander. U.S. Pat. No. 4,571,935 discloses steam extraction from a high pressure steam turbine [usually associated with combined cycle operation] to cool the outer shell and the stationary vanes in the expander. U.S. Pat. No. 4,571,935 also discloses system start up and the benefits of independent control of the gas turbine coolant stream. U.S. Pat. No. 4,338,780 discloses injecting a water spray into some of the gas turbine compressor exhaust to prepare a superior pass-through coolant for the moving blades of the gas turbine expander. U.S. Pat. No. 4,314,442 discloses steam cooling of the expander with a thermal barrier film of steam protecting the expander stationary vanes and rotating blades in a flow-through configuration. U.S. Pat. No. 3,973,396 discloses using an Hilsch tube expander to cool part of the gas turbine air compressor discharge before using an ejector configuration to feed this gas into the main air cooling stream to reduce its average temperature and provide a superior flow-through coolant. U.S. Pat. No. 3,783,614 discloses an elaborate closed loop gas turbine expander cooling system using a fluorocarbon refrigerant.

Finally, EPRI report IE-7300, A Comparison of Humid Air Turbine (HAT) Cycle and Combined Cycle Power Plants, March, 1991 prepared by A.D. Rao et. al. discloses the use of the heat of compression recovered from a stand alone air separation unit aftercooler to heat water to saturate the oxidant stream fed to the gas turbine combustor.

SUMMARY OF THE INVENTION

The present invention is related to an improvement for a process for the generation of electrical power, wherein, in a cryogenic air separation unit, compressed air is distilled into an oxygen product and a waste nitrogen product, wherein at least a portion of the oxygen product is compressed and reacted with a carbonaceous fuel, in a gasifier or partial oxidation unit, to produce a synthesis (fuel) gas comprising carbon monoxide and hydrogen, wherein feed air is compressed in a gas turbine feed air compressor and subsequently at least partially saturated; wherein the synthesis gas is combusted with the saturated, compressed, gas turbine feed air in a combustor to produce a combustion gas, which passes through a transition piece and is then expanded in a gas turbine to generate work, wherein at least a portion of the generated work is used to drive the gas turbine feed air compressor and wherein at least another portion of the generated work is used to generate electricity.

The improvement is characterized by: (a) supplying at least a portion of the compressed air to the cryogenic air separation unit by withdrawing a portion of the compressed, gas turbine feed air from the gas turbine feed air compressor; and (b) utilizing at least a portion of the heat of compression of the oxygen product to heat water to saturate the compressed, gas turbine feed air.

The improvement can be further characterized by feeding at least a portion of the waste nitrogen product to an intermediate stage of the gas turbine feed air compressor, or by injecting at least a portion of the waste nitrogen product as a controllable inert gas coolant, diluent or mass flow enhancing component into at least one piece of equipment selected from the group consisting of the combustor, the transition piece and the gas turbine, or by utilizing at least a portion of heat inherent to the withdrawn portion of the compressed, gas turbine feed air from the gas turbine feed air compressor being fed to the cryogenic air separation unit to warm the portion of the oxygen product fed to the gasifier or partial oxidation unit.

Optionally, the withdrawn portion of the compressed, gas turbine feed air from the gas turbine feed air compressor may be further compressed in an air separation unit air compressor prior to being fed to the air separation unit for distillation and the heat of compression resulting from the further compression is used to heat water to saturate the compressed, gas turbine feed air.

DETAILED DESCRIPTION OF THE INVENTION

The process of the present invention embodies various combinations of several integration improvements between an air separation unit and an integrated gasification humid air turbine or integrated gasification combined cycle power plant. The first improvement comprises supplying at least a portion of the compressed feed air to the air separation unit by removing a portion of the compressed air from an intermediate or intercooling section of the gas turbine air compressor. The second improvement comprises returning the waste nitrogen from the air separation unit to the inlet of a high pressure section of the gas turbine air compressor. The third improvement comprises returning the waste nitrogen from the air separation unit to the gas turbine combustor, transition piece, and/or expander as a controllable inert coolant, diluent or to increase mass flow-through the power generation section of the gas turbine. The fourth improvement comprises transferring at least a portion of the heat of compression in the integrated air separation unit air feed to the high pressure oxygen feed to the gasifier. The fifth improvement comprises using a portion of the heat of compression of the oxygen product, the return nitrogen, or any supplemental air separation unit air to heat water to saturate the oxidant air or fuel streams fed to the gas turbine combustor. Depending on the particulars of each integrated gasification power plant, different combinations of the improvements are most suitable for implementation. The five embodiments that follow represent some of the most beneficial combinations of these concepts for the types of integrated gasification power plants most likely to be constructed in the future.

Figure 1:
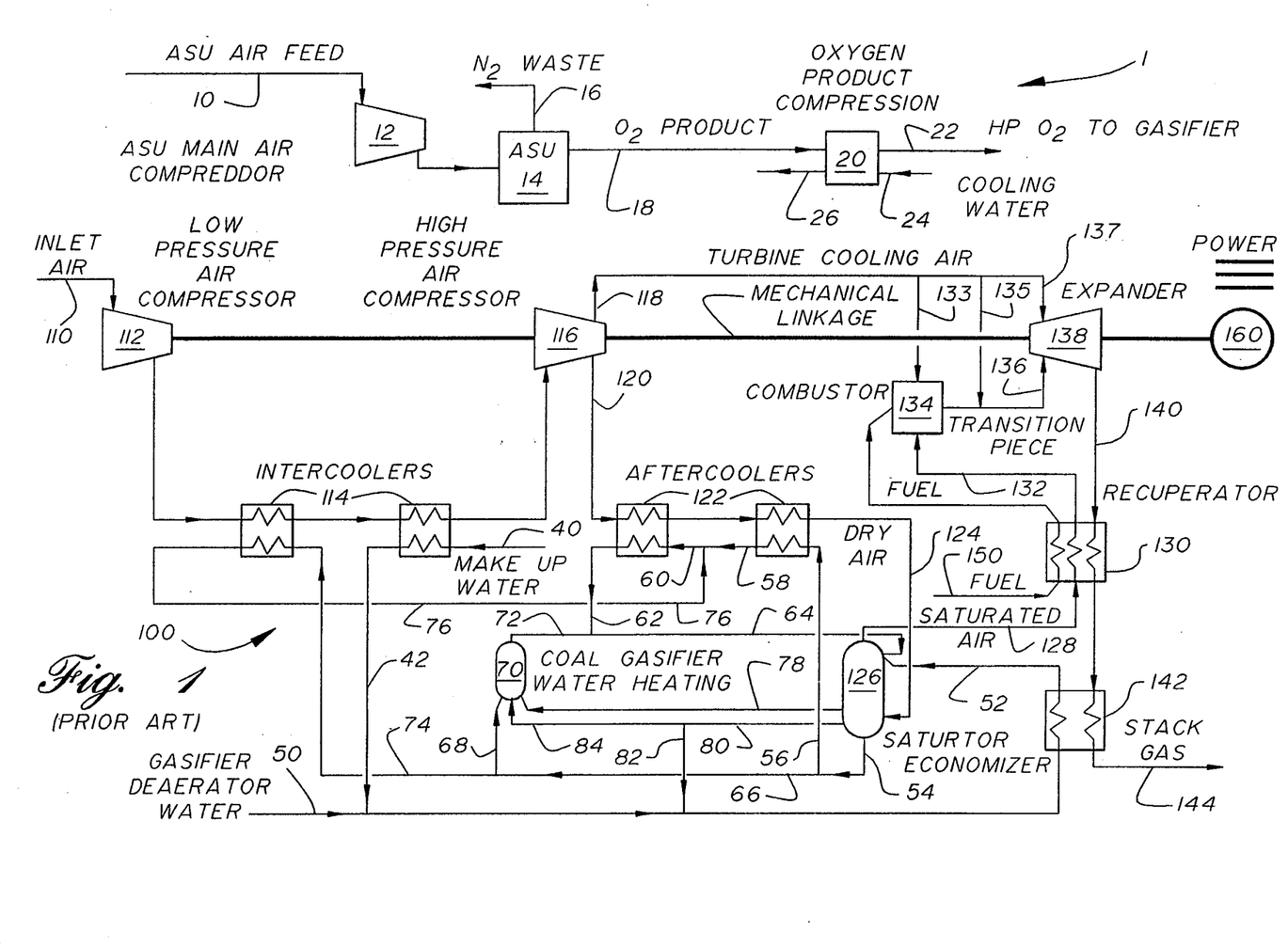
FIG. 1 is a schematic diagram of a non-integrated, prior art process.

FIG. 1 illustrates a conventional, integrated gasification humid air turbine power plant with a stand alone air separation unit. The process of FIG. 1 is the HAT baseline for the present invention.

With reference to FIG. 1, air separation unit 1 and integrated humid air turbine cycle 100 are shown. As stated above, air separation unit 1 and integrated humid air turbine cycle 100 are not integrated with each other; they are stand alone operations.

With respect to air separation unit 1 of FIG. 1, feed air, in line 10, is compressed in compressor 12. This compressed feed air is purified of contaminants, such as water, carbon dioxide and hydrocarbons, and then fed to cryogenic distillation column system 14 for production of at least an oxygen product and a nitrogen product. This cryogenic distillation column system can be of any type, i.e., single or multiple column, conventional or elevated pressure. Further, this cryogenic distillation column system can be capable of producing an argon product. In the present application, as shown, the nitrogen product is removed, via line 16, and vented as waste. The oxygen product is removed, via line 18, and compressed, in compressor 20, to the required pressure for use in a gasifier. To remove the heat of compression, cooling water is fed, via line 24, to the intercoolers or aftercoolers of compressor 20. The warmed, cooling water is removed, via line 26.

With respect to integrated humid air turbine cycle 100, feed air, in line 110, is compressed in low pressure air compressor 112, cooled in intercooler(s) 114, further compressed in high pressure air compressor 116 and, then split into two portions, a first compressed air portion, in line 120, and a second compressed air portion, in line 118. The first compressed air portion, in line 120, aftercooled in aftercooler(s) 122 and then saturated with water in saturator 126. The saturated, compressed, first feed air portion, in line 128 is further heated against cooling stack gas in recuperator 130. This heated, saturated, compressed, first feed air portion, in line 132, is then combusted in combustor 134, with fuel gas, via line 150, which has also been heated in recuperator 130. The combustion product, in line 136, is expanded in expander 138 to generate shaft work which in turn is used to drive compressors 112 and 116 and to produce electricity using generator 160. The second compressed air portion, in line 118, is used as turbine cooling air. This turbine cooling air can be fed at various entry points, e.g. via line 133 to combustor 134, via line 135 to the transition piece, via line 137 to expander 138 or any combination thereof. The exhaust gas from expander 138, in line 140 is cooled in recuperator 130 and economizer (heat exchanger) 142 before being vented as stack gas, via line 144.

Further, with respect to integrated humid air turbine cycle 100, make-up water is fed, via line 40, to the latter of intercooler(s) 114 and then combined with water from a gasifier deaerator, via line 50. This combined water stream is warmed in economizer 142 before being fed to an upper location of saturator 126. In saturator 126, warm water is contacted with dry air, in line 124, to produce saturated air, in line 128, for later introduction into combustor 134. A portion of the excess water from saturator 126 is used to recover the heat of compression from the compressed feed air stream, originating in line 110. This heat of compression is recovered by means of intercooler(s) 114 and aftercooler(s) 122. Further, any additional heat required for the saturation of the dry, compressed air, in line 124, is produced in coal gasifier water heater 70. As depicted, water is removed from the bottom of saturator 126, via line 54 and split into three substreams. The first substream, in line 56, is fed to and warmed in the second of aftercooler(s) 122. The second substream, in line 74, is fed to and warmed in the first of intercooler(s) 114 and then combined, via line 76, with the warmed water from second aftercooler 122, in line 58. This combined warmed water stream, in line 60, is fed to and warmed in first aftercooler(s) 122. The third substream, in line 68, is, along with at least portions of the intermediate water streams, in lines 78 and 80, is heated in heater 70. The heated water, in line 72, is combined with the heated water, in line 62, and fed, via line 64, to an upper location of saturator 126. Finally, a portion of the lower intermediate water stream, in line 80, is combined, via line 82, with the water from the gasifier aerator, via line 50.

Figure 2:
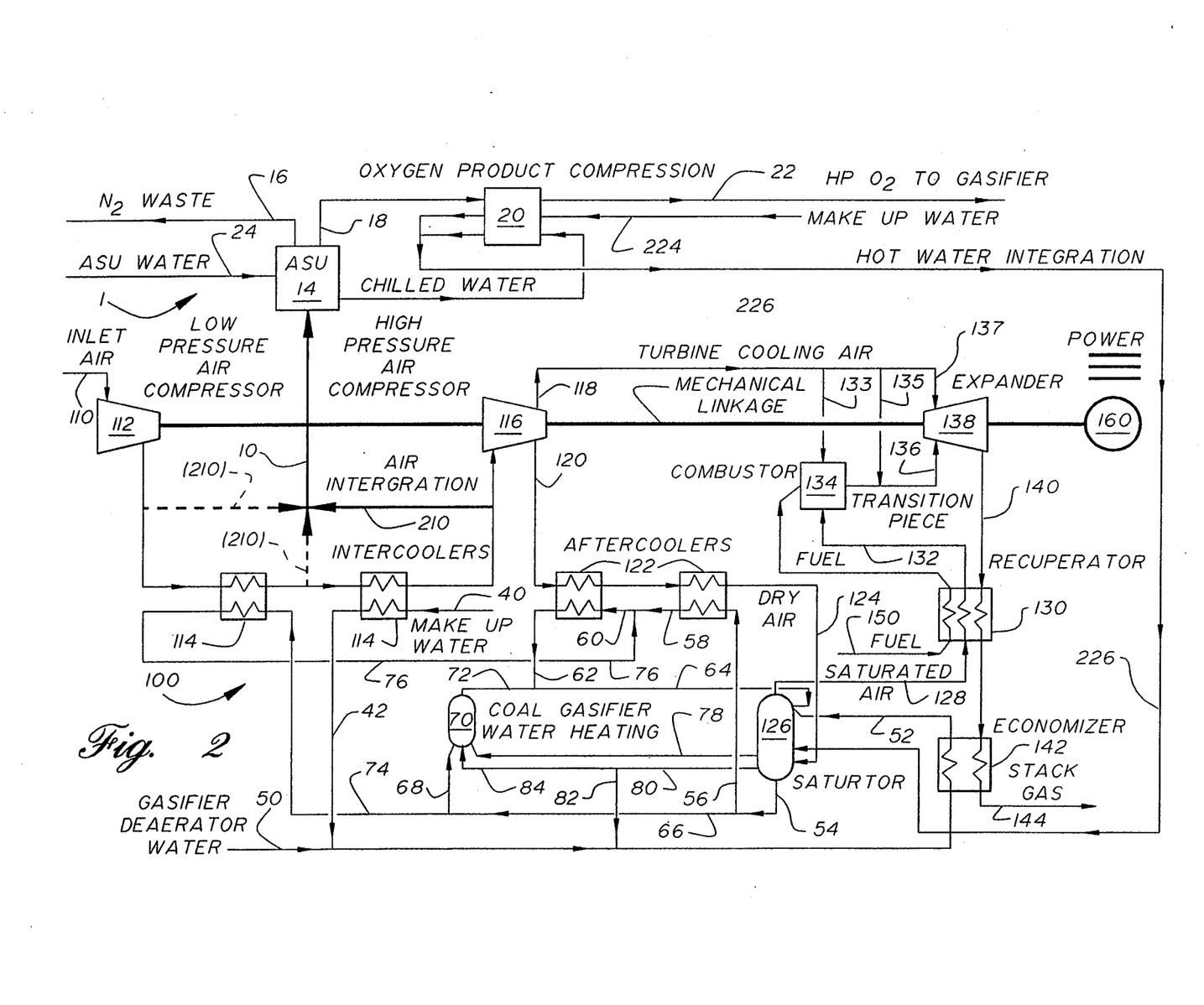
FIGS. 2 through 8 are schematic diagrams of several embodiments of the process of the present invention.

FIG. 2 illustrates an embodiment of the present invention employing the concepts of extracting part or all of the compressed air feed to a low pressure air separation unit from an intercooling section in the gas turbine air compressor and returning some of the waste heat from oxygen product compression to the saturator. With reference to FIG. 2, a portion of the compressed air exiting compressor 112 is removed, via line 210. This portion can be removed from one of three locations, prior to intercooler(s) 114, from intercooler(s) 114 and after intercooler(s) 114. The preferred position, as shown by the solid line, is after intercooler(s) 114. The actual location would be such to optimize the integration for a specific system.

Further, demineralized makeup water, in lines 24 and 224, is warmed by heat exchange with various streams of air separation unit 1 including the compressed oxygen stream, delivered in line 22; thus, intercooling and optionally aftercooling the stream to remove the heat of compression. The warmed, makeup water is fed, via line 226, to saturator 126, as part of the makeup water for the humidification of the turbine air. Other locations for integrating the hot water from air separation unit 1 are possible; the actual location would be such to optimize the integration. The rest of FIG. 2 remains unchanged from FIG. 1. Similar streams and process equipment in the Figures of the drawing utilize the same identifier number.

As can be seen, FIG. 2 shows all of the compressed air feed to the low pressure air separation unit as being withdrawn from the gas turbine compressor intercooling section but it is also possible to supply only part of the air separation unit compressed air feed from this source to best match the loading capabilities of the gas turbine. The preferred conditions of the air integration stream, in line 210, are a pressure in the range of 50–150 psia and a temperature of about the temperature of the makeup or cooling water supplies.

FIG. 2 shows all of the oxygen product compression intercooling accomplished with demineralized makeup water directed to saturator 126. In cases where excess makeup water heating capacity is required, it is possible to direct only part of the heat of oxygen product compression to the more expensive demineralized makeup water with the remainder of the heat sent to regular cooling water. As an option, this hot water integration can be directed to economizer 142 or coal gasifier water heating system 70 for further heating before entering the oxidant air saturator.

Figure 3:
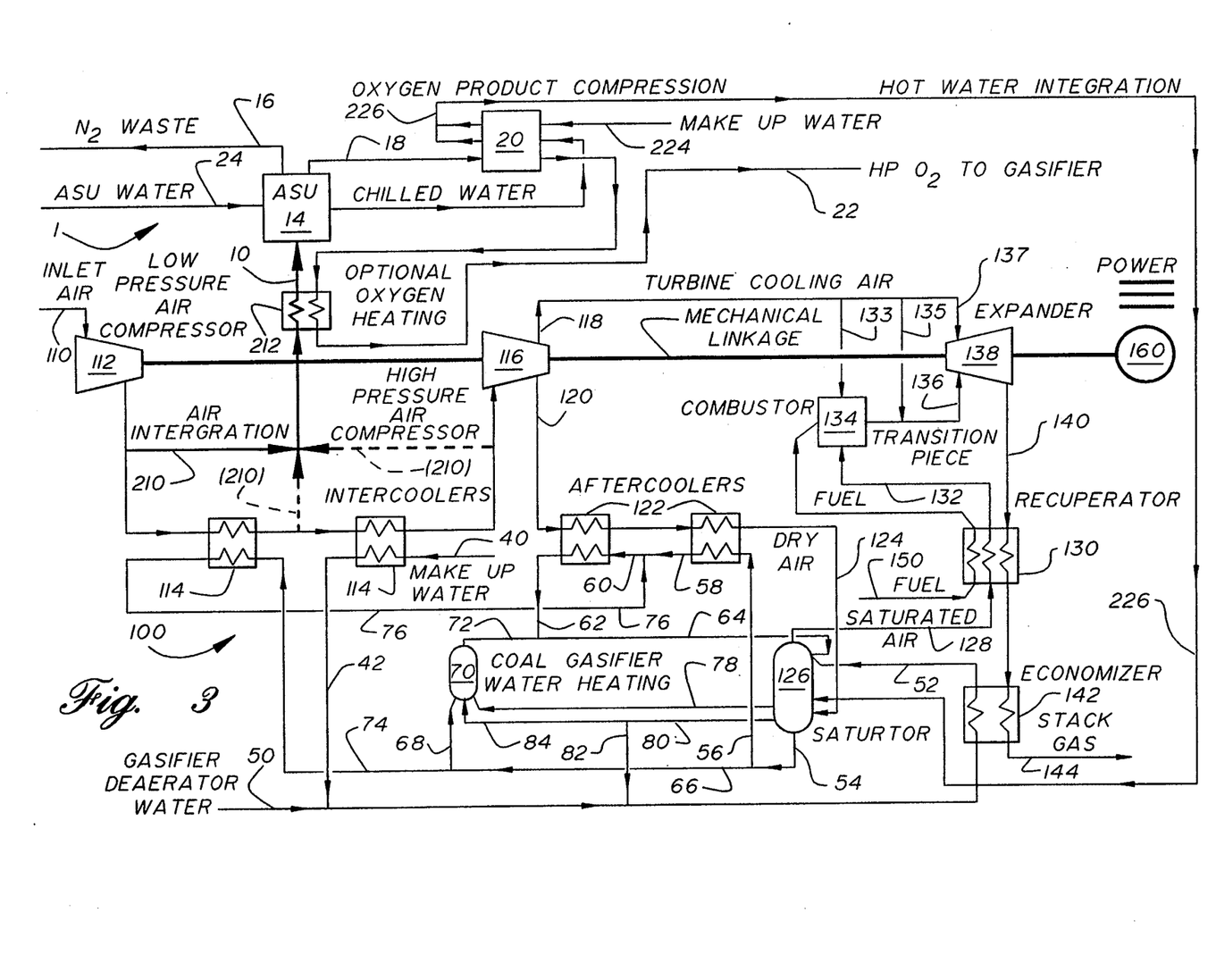

Another configuration for this embodiment is shown in FIG. 3. This embodiment shows the addition of heat exchanger 212 between the air integration stream, in line 210, and the high pressure oxygen feed to the gasifier, in line 22. This option employs the concept of transferring some of the heat of compression of the integrated air separation unit air feed to the high pressure oxygen feed to the gasifier. As above, the air integration stream, in line 210, may be withdrawn at any point in the intermediate or intercooling section of the gas turbine air compressor (shown by dashed lines in the Figure) so as to best optimize the cooling and heating in the system.

Figure 4:
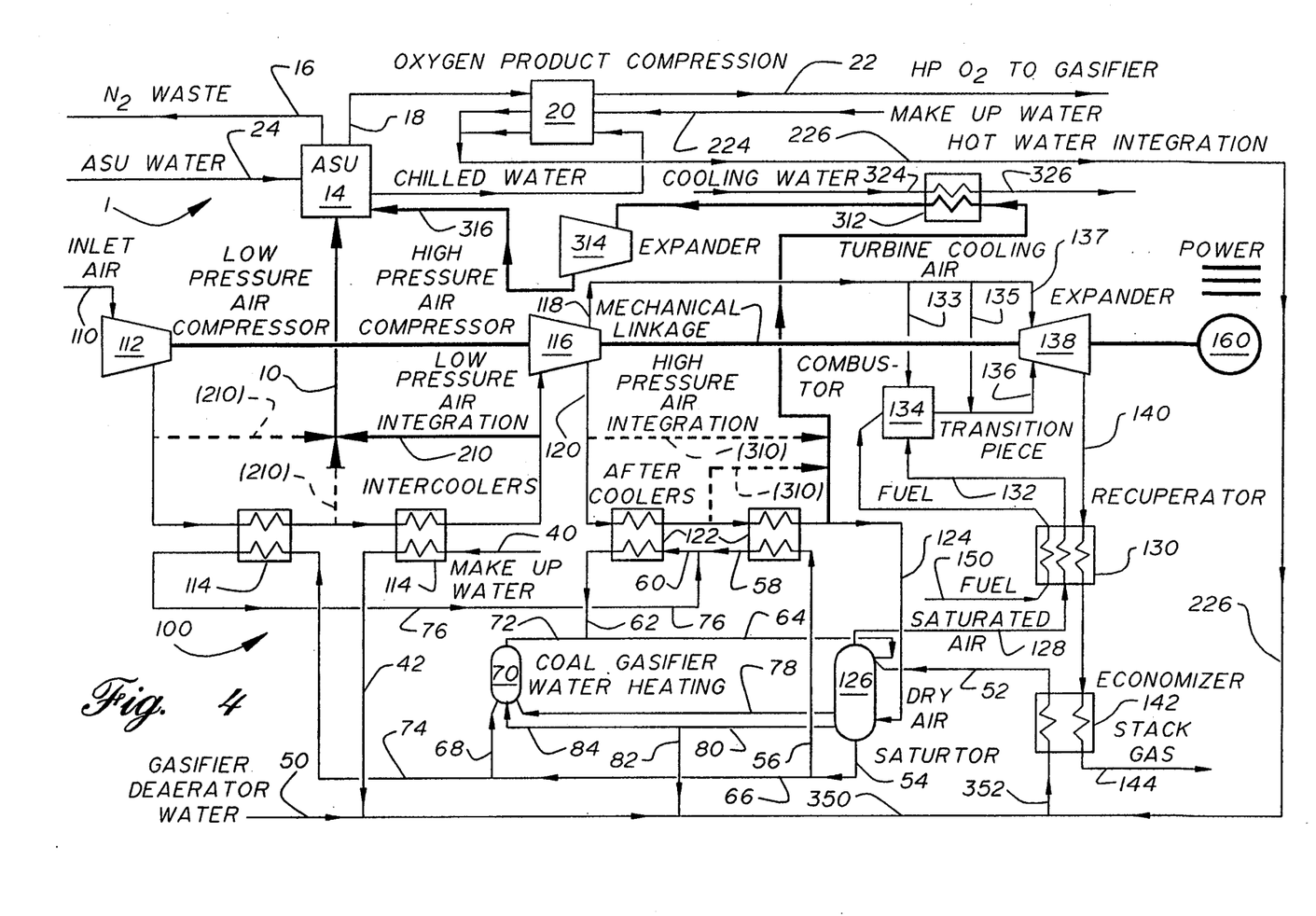

FIG. 4 shows a second embodiment of the invention, again employing the concepts of extracting part or all of the low pressure, compressed air feed to a low pressure air separation unit from an intercooling section in the main gas turbine air compressor and returning some of the waste heat from oxygen product compression to the oxidant saturator. However, unlike the systems shown in FIGS. 2 and 3, this embodiment employs a pumped liquid oxygen (LOX) cycle which requires a portion of the feed to the air separation unit to be at a pressure greater than about 100 psia.

FIG. 4 shows all of the lower pressure, compressed air feed to air separation unit being withdrawn, via line 210, from the gas turbine compressor intercooler and all of the higher pressure air feed to the air separation unit being withdrawn, via line 310, from the outlet of aftercooler(s) 122. It is important to note that it is also possible to supply only part of the air separation unit compressed air feed from these sources to best match the loading capabilities of the gas turbine. The preferred conditions of the lower pressure, air integration stream, in line 210, are a pressure in the range of 50-150 psia and a temperature of about the temperature of the makeup or cooling water supplies. As was the case for the first embodiment, it is possible to withdraw the low pressure air integration stream at any point in the intermediate or intercooling section of the gas turbine air compressor (shown by dashed lines in the figure) so as to best optimize the intercooling in the system. The preferred conditions of the higher pressure air integration stream, in line 310, are a pressure of greater than about 100 psia and a temperature of about the temperature of the makeup or cooling water supplies. Similarly, with this embodiment, it is possible to withdraw the high pressure air integration stream at any point in the aftercooling section of the gas turbine air compressor (shown by dashed lines in the figure) so as to best optimize the aftercooling in the system. It is also possible to move water feed cooler 312 associated with the high pressure air integration to a point immediately down stream of expander 314 or to remove it entirely so as to optimally generate additional power or to provide more refrigeration to the high pressure air integration stream, as needed. The need for expander 314 will be determined by the optimized pressures selected for the compressed gas turbine feed air, in line 120, and the air separation unit feed air, in line 316. This optimized pressure is a characteristic of the IGHAT or IGCC process.

FIG. 4 also shows all of the oxygen product compression intercooling accomplished with demineralized makeup water directed to saturator 126. In cases where excess make up water heating capacity is required, it is possible to direct only part of the heat of oxygen product compression to the more expensive demineralized makeup water with the remainder of the heat sent to regular cooling water. As an option, this hot water integration can be directed to economizer 142 or coal gasifier water heating system 70 for further heating before entering saturator 126.

FIG. 4 shows two distinct air pressure levels for air separation unit integration. More advanced cryogenic air separation cycles could require three or more distinct air pressure levels for optimum integration.

Figure 5:
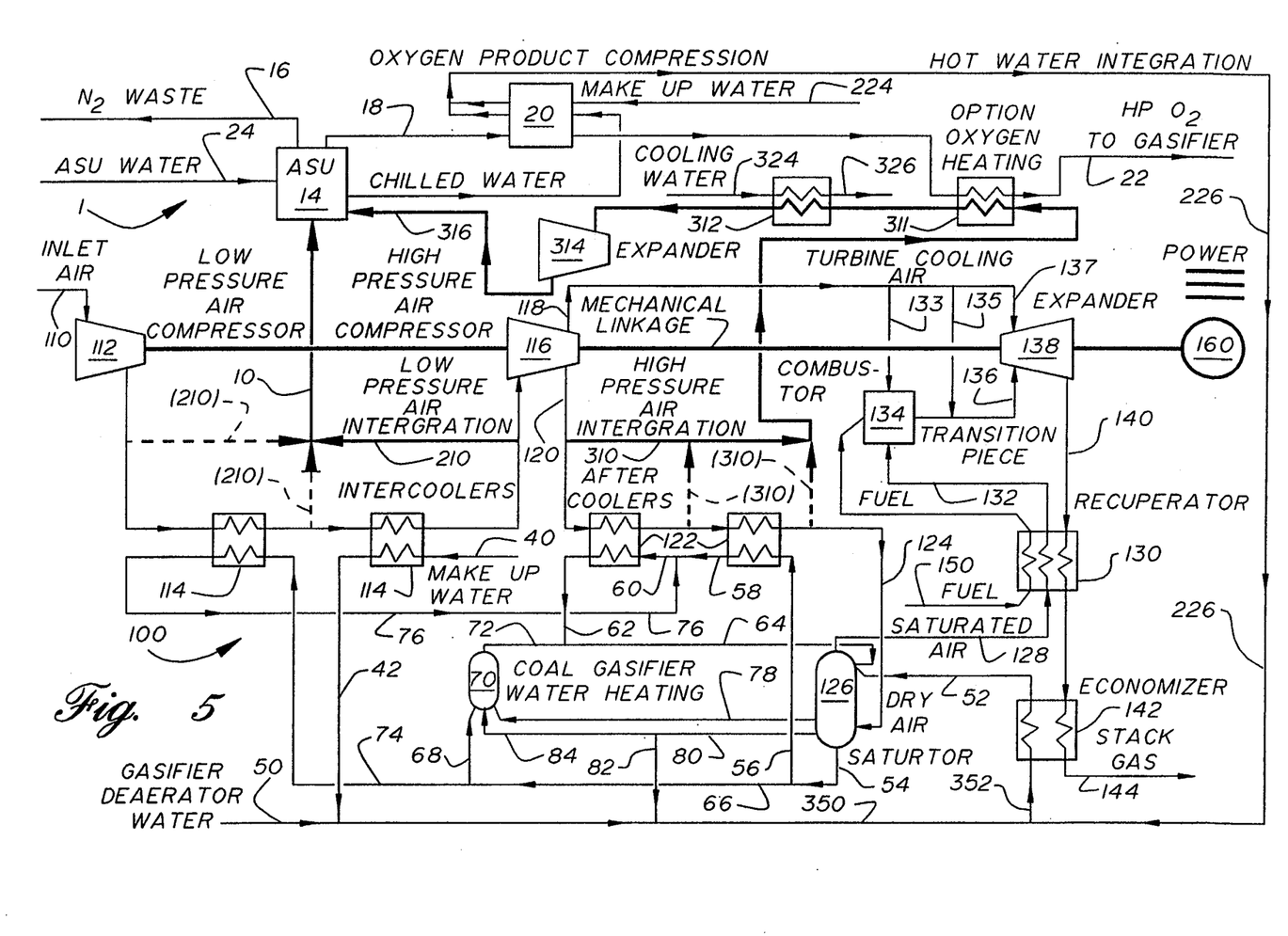

Another configuration for this second embodiment is shown in FIG. 5. Like FIG. 3, FIG. 5 shows the addition of heat exchange (exchanger 311) between the high pressure air integration stream and the high pressure oxygen feed to the gasifier. This option employs the concept of transferring some of the heat of compression of the integrated air separation unit air feed to the high pressure oxygen feed to the gasifier.

Figure 6:
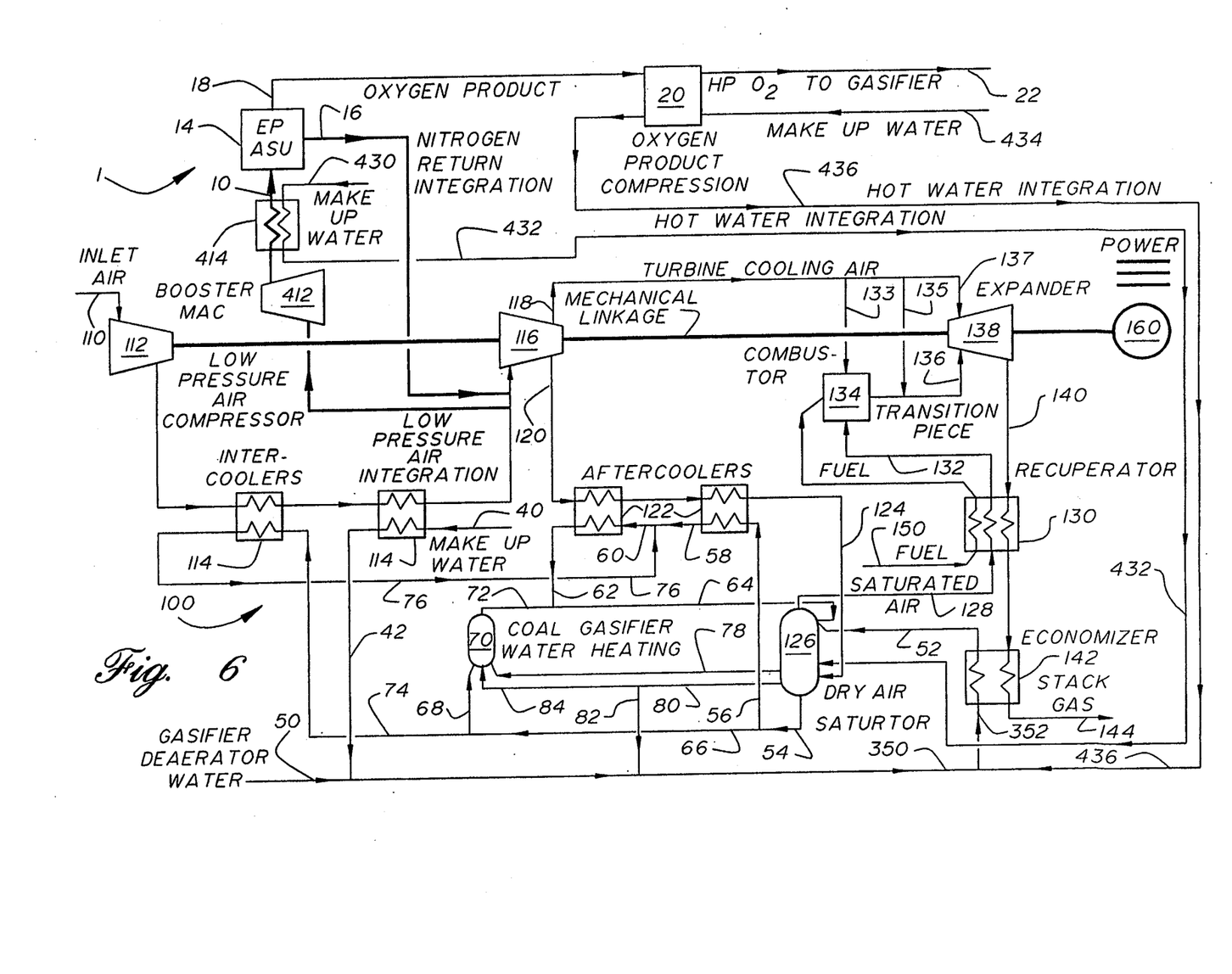

FIG. 6 shows a third embodiment of the invention employing the concepts of extracting part or all of the compressed air feed to an elevated pressure air separation unit (EP ASU) from an intercooling section in the main gas turbine air compressor, returning some or all of the waste nitrogen from the air separation unit to the air feed of a high pressure section of the gas turbine air compressor, and returning some of the waste heat from oxygen product compression and supplemental air separation unit air compression to the oxidant saturator. Unlike the systems shown in FIGS. 2 through 5, air separation unit 1 in this embodiment employs an elevated pressure air cycle which may require the feed to the air separation unit at a pressure higher than the intercooling section pressure.

With respect to FIG. 6, this higher pressure feed air is provided by further compressing in booster compressor 412 the air integration stream from the gas turbine intercooling section, in line 410. Although the figure shows all of air feed to the air separation unit being withdrawn from the gas turbine compressor intercooler, it is possible to supply only pad of the air separation unit air feed from this source so as to best match the loading capabilities of the gas turbine air compressor. As was the case for the first and second embodiments, it is possible to withdraw the low pressure air integration stream at any point in the intermediate or intercooling section of the gas turbine air compressor so as to best optimize the intercooling in the system. FIG. 6 shows all of the waste nitrogen, in line 16, from the air separation unit returning to the gas turbine compressor intercooling section. It is also possible to return only part of the air separation unit waste nitrogen to the gas turbine air compressor to best match the loading capabilities of the gas turbine. It should be noted that it is preferable to return the nitrogen to the primary compressed air stream downstream of the low pressure air integration stream withdrawal so as to maintain the oxygen concentration in the air separation unit feed air. The preferred conditions of the waste nitrogen return stream, in line 16, are a pressure and temperature equal to those of the intercooled air leaving the last gas turbine intercooler.

In addition, FIG. 6 shows all of the oxygen product compression intercooling and booster air compressor aftercooling accomplished with demineralized makeup water directed to saturator 126. In cases where excess makeup water heating capacity is required, it is possible to direct only part of the heat of oxygen product compression to the more expensive demineralized make up water with the remainder of the heat sent to regular cooling water. As an option, this hot water integration can be directed to the economizer or the coal gasifier water heating system for further heating before entering the oxidant saturator.

As in the earlier embodiments, an option for this third embodiment includes the concept of transferring some of the heat of compression of the integrated air separation unit air feed to the high pressure oxygen feed to the gasifier. In this embodiment, the option would preferably employ an additional oxygen heat exchanger (not shown in the figure) immediately downstream of any air integration stream booster compressor or upstream of the booster compressor if the air integration stream is withdrawn from the gas turbine section prior to intercooling.

Figure 7:
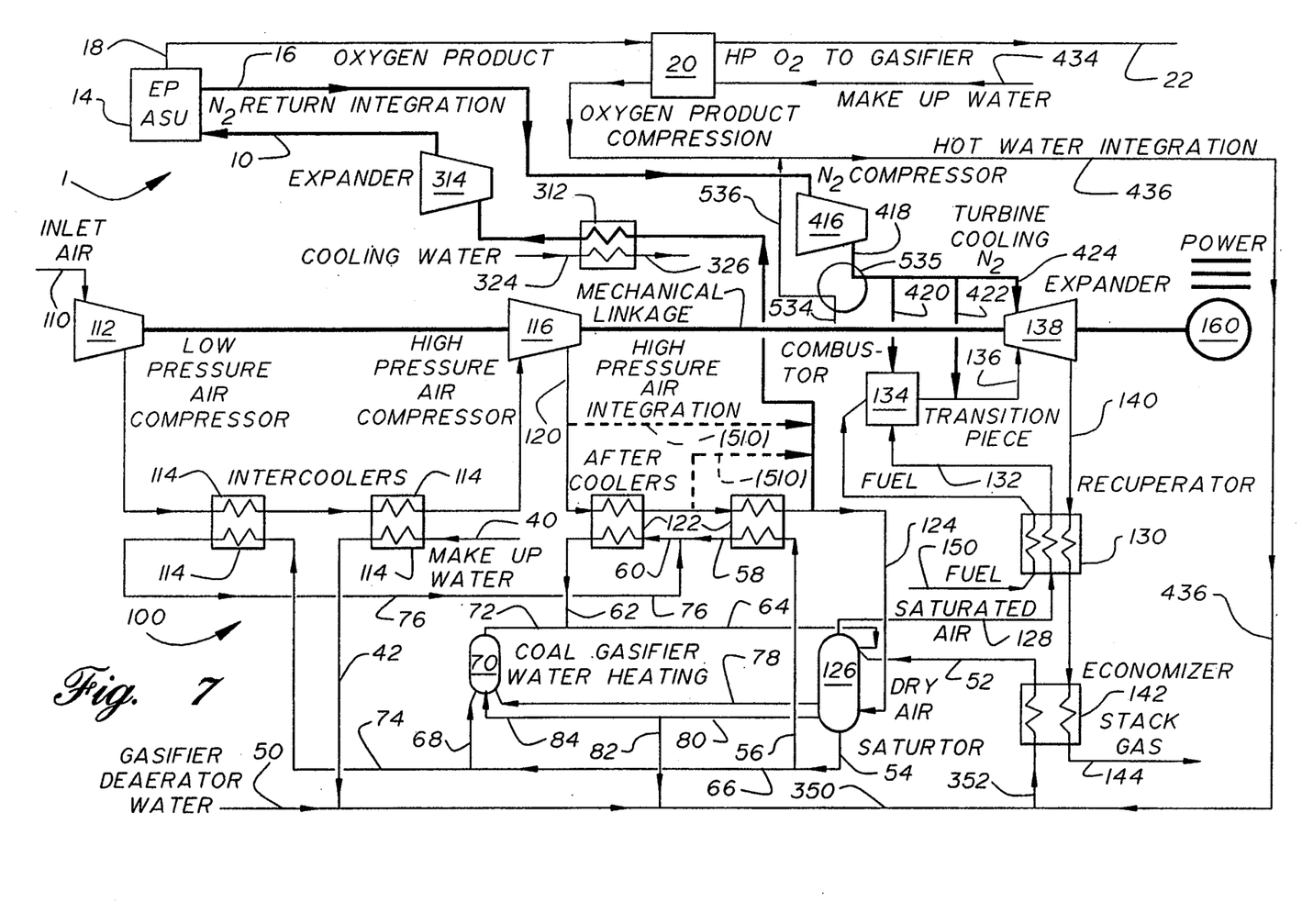

FIG. 7 shows a fourth embodiment of the invention employing the concepts of returning some or all of the waste nitrogen from the air separation unit to the combustor, transition piece, and/or expander of the gas turbine as a controllable inert coolant and returning some of the waste heat from oxygen product compression to the oxidant air saturator. This embodiment also uses technology to extract pad or all of the compressed air feed to an elevated pressure air separation unit from the discharge of the highest pressure section of the gas turbine air compressor. Like the system shown in FIG. 6, air separation unit 1 employs an elevated pressure cycle. Depending on the actual design of the gas turbine air compressor, the air separation unit may require feed air at a pressure lower than the discharge pressure of gas turbine compressor 116.

If required, this lower pressure feed air stream is achieved through expanding in expander 314 the air integration stream, via line 510, from the gas turbine aftercooling section. FIG. 7 shows all of this compressed air feed to the air separation unit withdrawn from the gas turbine compressor aftercooler. Nevertheless, it is also possible to supply only part of the air separation unit compressed air feed from this source. As was the case for the second embodiment, it is possible to withdraw the high pressure air integration stream at any point in the aftercooling section of the gas turbine air compressor (shown by dashed lines in the figure) so as to best optimize the aftercooling in the system. It is also possible to move the water feed cooler associated with the high pressure air integration to a point immediately downstream of the expander or to remove it entirely so as to optimally generate additional power or to provide more refrigeration to the high pressure air integration stream as needed.

Figure 8:
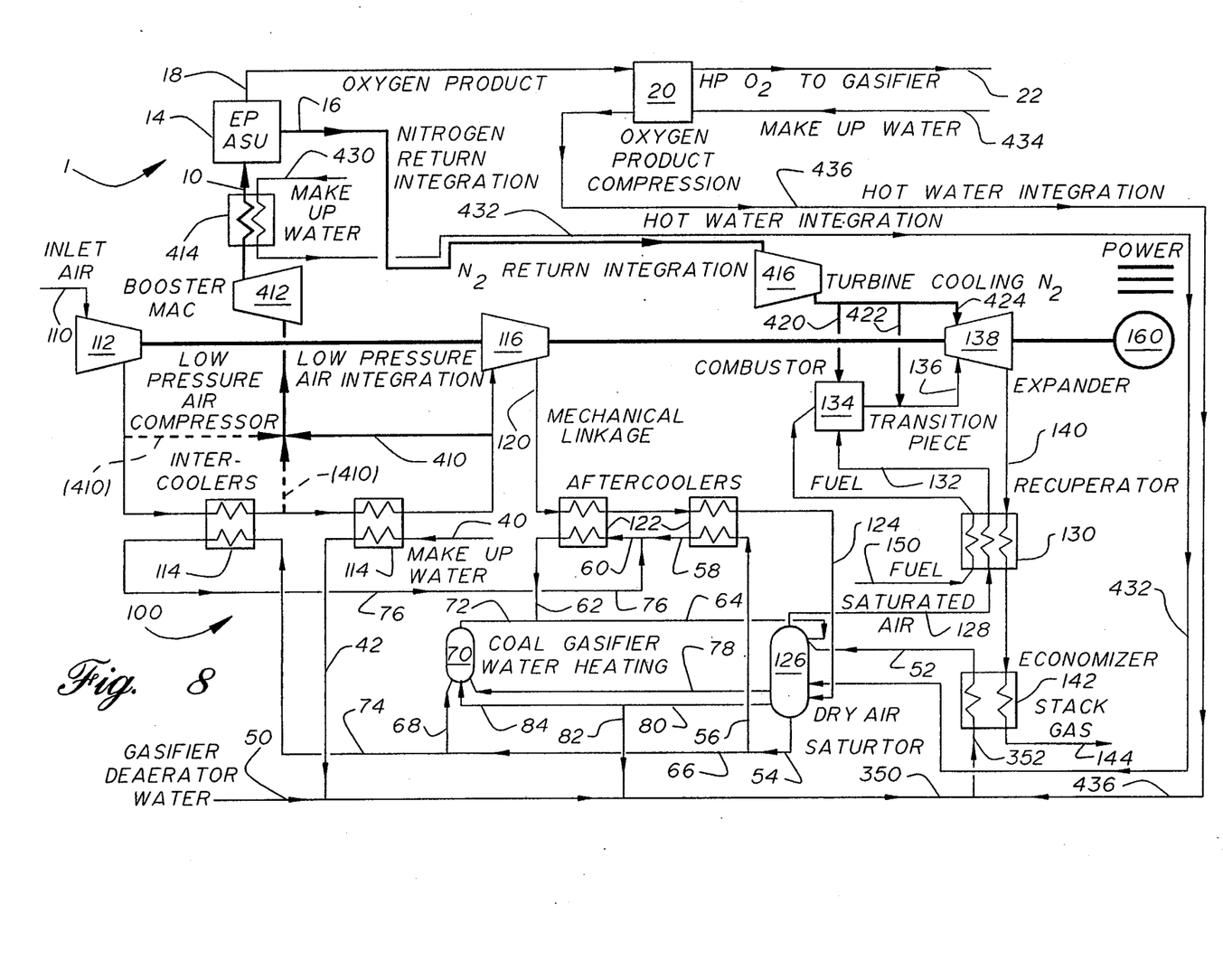

As is shown in FIG. 8, it is further possible to employ the concept of withdrawing the compressed feed air from the intermediate or intercooling section of the gas turbine compressor with auxiliary booster compression provided by compressor 412 to best fit the air separation unit integration into the loading capabilities of the gas turbine. The preferred conditions of the air integration stream are the same as discussed for the third embodiment, Similarly with this embodiment, it is possible to withdraw the low pressure air integration stream at any point in the intermediate or intercooling section of the gas turbine air compressor (shown by dashed lines in the figure) so as to best optimize the intercooling in the system.

Both FIGS. 7 and 8 further show all of the nitrogen waste, in line 16, from the air separation unit being returned to the gas turbine combustor, transition piece, and/or expander cooling stream, via line 420, 422 and 424, respectively. "As is shown in FIG. 7, there are times when the nitrogen waste, in line 1 needs to be compressed prior to being returned to the to the gas turbine combustor, transition piece and/or expander cooling stream. This compression can be accomplished via compressor 416. The heat of compression from the compression step which is inherent in the compressed nitrogen, in line 418, can be transferred to makeup water, in line 534, using heat exchanger 535 for provide hot water for the hot water integration." It is also possible to return only part of the air separation unit waste nitrogen (at the appropriate pressures) to the gas turbine combustor, transition piece, and expander to best match their cooling requirements. If the use of nitrogen for cooling is not required or preferred, the nitrogen can be returned to any of these locations to provide additional mass flow-through the power generation system of the gas turbine and/or to the combustor or fuel supply to act as a diluent to reduce flame temperature and thereby limit NOx formation.

In addition, FIGS. 7 and 8 show all of oxygen product compressor 20 intercooling and/or booster compressor 412 aftercooling accomplished with demineralized makeup water, which is sent to saturator 126 and/or economizer 142. In cases where excess make up water heating capacity is required, it is possible to direct only pad of the heat of oxygen product compression to the more expensive demineralized makeup water with the remainder of the heat sent to regular cooling water. Furthermore, it is possible to send some or all of the heat of compression of the nitrogen return stream to demineralized makeup water. As an option, this hot water integration can be directed to coal gasifier water heating system 70 for further heating before entering saturator 126.

As in the earlier embodiments, an option for this embodiment includes the concept of transferring some of the heat of compression of the integrated air separation unit air feed to the high pressure oxygen feed to the gasifier. In the embodiment as shown in FIG. 7, the option would preferably employ an additional oxygen heat exchanger (not shown) immediately downstream of the high pressure air integration withdrawal point from the gas turbine compressor. In the embodiment as shown in FIG. 8, the option would preferably employ an additional oxygen heat exchanger (not shown) immediately downstream of any air integration stream booster compressor or upstream of this unit if the air integration stream is withdrawn from the gas turbine section prior to intercooling. A further option allows some additional heat of compression from the turbine cooling nitrogen to be transferred to the oxygen stream. This would be accomplished by placing a heat exchanger downstream of both the oxygen and the nitrogen compressors.

The present invention as discussed in the previous four embodiments is a significant advancement of the art because the present invention has reduced capital costs, an increased power output and/or a higher efficiency at a fixed power output. The present invention improves the operating flexibility of an integrated gasification humid air turbine (integrated gasification humid air turbine) or combined cycle (integrated gasification combined cycle) power plant. The invention differs from previous processes disclosed in the background art in its embodiment of various combinations of four key concepts of integration between an air separation unit and an integrated gasification humid air turbine or integrated gasification combined cycle power plant. The first concept is withdrawal of part or all of the compressed air feed to the air separation unit from an intermediate or intercooling section in the gas turbine air compressor. The second concept is return of the waste nitrogen from the air separation unit at an intermediate pressure to the air feed of a high pressure stage in the gas turbine air compressor. The third concept is return of the waste nitrogen from the air separation unit to the gas turbine combustor, transition piece, and/or expander as a controllable inert coolant. The fourth concept is transfer of some of the heat of compression of the integrated air separation unit air feed to the high pressure oxygen feed to the gasifier. The fifth concept is use of some of the heat of compression of the oxygen product, the return nitrogen, or any supplemental air separation unit air to heat water to saturate the oxidant air or fuel streams fed to the gas turbine combustor. Depending on the particulars of each integrated gasification power plant, different combinations of these concepts provide the greatest improvement relative to background art.

Although the cryogenic air separation units previously described all show the use of an oxygen compressor, it is also possible to utilize cycles employing the liquid pumping of oxygen to its final delivery pressure. In these cases, a compressed fluid such air or nitrogen would be used to vaporize the pumped oxygen. The compressors for these fluids would be integrated into the gas turbine cycle as described for the oxygen or booster air compressors.

The four embodiments for integrated gasification humid air turbine-air separation unit integration portrayed in the detailed description of the invention were evaluated by computer aided process simulation to determine their benefits compared with the existing technology. The plant scale used for the simulation was that of the integrated gasification humid air turbine system disclosed by A. D. Rao and W. H. Day at the 10th and 11th Annual EPRI Conferences on Gasification Power Plants in 1991 and 1992 with a nominal power output of 230 MW at a 90° F. ambient temperature. The corresponding oxygen plant scale is 1400 tons per day (pure $O_2$ basis) producing 95% pure oxygen. Table 1 summarizes the results of the computer simulations for the base case existing humid air turbine technology (Columns I and III) and the proposed integrated gasification humid air turbine-air separation unit integrations (Columns II and IV through VI).

TABLE 1

|  | I Low Pressure ASU Base Case (FIG. 1) | II Low Pressure ASU Integrated Case (FIG. 2) | III Low Pressure Pumped LOX Base Case (FIG. 1) | IV Low Pressure Pumped LOX Integrated Case (FIG. 4) | V Elevated Pressure $N_2$ Return Integrated Case (FIG. 6) | VI Elevated Pressure $N_2$ Cool Integrated Case (FIG. 7) |
|---|---|---|---|---|---|---|
| Air Separation Unit Feed Air Temperature: °F. | 90 | 103 | 90 | 103, 50 | 90 | 50 |
| Air Separation Unit Feed Air Pressure: psia | 14.7 | 70 | 14.7 | 70, 200 | 242 | 200 |
| Air Separation Unit Total Power: KW | 19,756 | 7,765 | 19,026 | 3,250 | 15,999 | 19,675 |
| Gas Turbine Air Compressor Power: KW | 102,254 | 116,613 | 101,254 | 125,245 | 105,825 | 113,563 |
| Turbine Inlet Temperature: °F. | 2,408 | 2,408 | 2,408 | 2,408 | 2,408 | 2,408 |
| Turbine Inlet Pressure: psia | 530 | 537 | 530 | 541 | 535 | 550 |
| Extra Fuel: % |  | 1.6 |  | 2.3 | 0.8 | 4.2 |
| Net Power*: MW | 209.3 | 212.4 | 210.0 | 211.7 | 212.8 | 216.3 |
| Total Heat Rate*: HHV BTU/KWh | 8,090 | 8,095 | 8,062 | 8,175 | 8,017 | 8,158 |

*Net power and total heat rate refer to the gas turbine expander power output less the total power to drive the gas turbine HP and LP gas turbine compressors, the air separation unit air compressor, the waste nitrogen compressor and the oxygen product compressor; the BTU's refer to the coal feed.

The first embodiment (Column II) employs the concepts of extracting all or part of the compressed air feed to a low pressure air separation unit from an intercooling section in the main gas turbine air compressor and returning some of the waste heat from oxygen product compression to the oxidant saturator. This embodiment, shown earlier in FIG. 2, is best compared with the existing technology of an integrated gasification humid air turbine with a stand alone low pressure air separation unit (Column I). The invention has the benefits of reducing or eliminating the air separation unit main air compressor with an associated capital savings of as much as $7,000,000 and increasing the capacity of the plant by as much as 3.1 MW at essentially the same heat rate. Furthermore, the invention allows the air separation plant to operate at a more optimum 50–150 psia air feed pressure without auxiliary expansion or compression than the previous technology of air separation unit feed air withdrawal from the high pressure discharge of the gas turbine air compressor disclosed by the background art. In addition, depending on the particulars of the intercooling system, cooling duty may be shifted to the air separation unit by adjusting the air separation unit air feed withdrawal location relative to the intercooler providing additional design or operating flexibility. The costs for these improvements are relatively minor, i.e., the lower pressure stages of the gas turbine air compressor may require increased capacity, the gas turbine compressor intercooler may require more area, and the fuel flow is increased by 1.6% relative to the base case. With the option of sending some of the heat of compression of the integrated air separation unit air feed to the high pressure oxygen feed to the gasifier shown in FIG. 3, the oxygen can be fed to the gasifier at a higher temperature which will improve the gasifier's performance. The trade off for this improvement in gasifier operation is that less heat of compression can be transferred to the oxidant air saturator, but since this improvement transfers heat more directly into the process, the option can produce additional net benefits.

The second embodiment (Column IV) also employs the concepts of extracting all or part of the low pressure compressed air feed to a low pressure air separation unit from an intercooling section in the main gas turbine air compressor and returning some of the waste heat from oxygen product compression to the oxidant saturator. This embodiment, shown earlier in FIG. 4, also withdraws all of the high pressure air feed associated with the pumped liquid oxygen (LOX) part of the cycle from the exhaust of a high pressure section of the gas turbine air compressor and is best compared with the existing technology of an integrated gasification humid air turbine with a stand alone low pressure pumped liquid oxygen (LOX) air separation unit (Column III). The invention has the benefits of reducing or eliminating the air separation unit main air compressor with an associated capital savings as much as $8,000,000 and increasing the capacity of the plant by 1.7 MW at a slightly higher heat rate. Furthermore, as in the first embodiment, the invention allows the air separation plant to operate at a more optimum 50-150 psia air feed pressure without auxiliary expansion or compression than the previous technology of air separation unit feed air withdrawal from the high pressure discharge of the gas turbine air compressor disclosed by the background art. In addition, depending on the particulars of the intercooling and aftercooling systems, cooling duty may be shifted to the air separation unit by adjusting the air separation unit air feed withdrawal locations relative to the intercooler and aftercooler providing additional design or operating flexibility. The costs for these improvements are relatively minor in that the gas turbine air compressor may require increased capacity, the gas turbine compressor intercooler and aftercooler may require more area, an additional air expander may be needed if the high pressure gas turbine air compressor discharge pressure is significantly higher than the air separation unit high pressure air feed, and the fuel flow is increased by 2.3% relative to the base case. With the option of sending some of the heat of compression of the integrated air separation unit air feed to the high pressure oxygen feed to the gasifier shown in FIG. 5, the oxygen can be fed to the gasifier at a higher temperature which will improve the gasifier's performance. As before, the trade off for this improvement in gasifier operation is that less heat of compression can be transferred to the oxidant air saturator, but since this improvement transfers heat more directly into the process, the option can produce additional net benefits.

The third embodiment (Column V) employs the concepts of extracting all or part of the compressed air feed to an elevated pressure air separation unit from an intercooling section in the main gas turbine air compressor, returning some or all of the waste nitrogen from the air separation unit to the air feed of a high pressure section of the gas turbine air compressor, and returning some of the waste heat from oxygen product compression to the oxidant air saturator. This embodiment, shown earlier in FIG. 6, is best compared with the existing technology of an integrated gasification humid air turbine with a stand alone low pressure air separation unit (Column I). The invention has the benefits of reducing or eliminating the air separation unit main air compressor with an associated capital savings of ~$7,000,000, significantly reducing the size of the oxygen compressor, and increasing the capacity of the plant by 3.5 MW at a slightly better heat rate. This embodiment has the advantage of returning the energy of compression of the intermediate pressure nitrogen product from the air separation unit to the gas turbine system without any auxiliary compression equipment, unlike the previous technology of returning the nitrogen from an elevated pressure cycle air separation unit to the fuel stream or directly to the combustion chamber as disclosed in the background art. In addition, the nitrogen can be returned at a lower or higher temperature than that of the air stream to which it is added. This can provide the additional benefit of enhanced control of the inlet conditions to the subsequent gas turbine compressor stage. For example, the nitrogen can be returned below the air stream temperature to supercharge the high pressure section of the gas turbine when the ambient temperature is high to improve the compression efficiency. In addition, depending on the particulars of the intercooling system, cooling duty may be shifted to the air separation unit by adjusting the air separation unit air feed withdrawal location and nitrogen return location relative to the intercooler providing additional design or operating flexibility. The costs for these improvements are relatively minor, i.e., that the lower pressure stages of the gas turbine air compressor may require very slightly increased capacity, the gas turbine compressor intercooler may require slightly more area, an additional booster air compressor for the air separation unit is required, and the fuel flow is increased by 0.8% relative to the base case. With the option of sending some of the heat of compression of the integrated air separation unit air feed to the high pressure oxygen feed to the gasifier, the oxygen can be fed to the gasifier at a higher temperature which will improve the gasifier's performance. As before, the trade off for this improvement in gasifier operation is that less heat of compression can be transferred to the oxidant air saturator, but since this improvement transfers heat more directly into the process, the option can produce additional net benefits. Also, it should be noted that the oxidant air oxygen content is reduced from roughly 20% excess to roughly 10% excess in this embodiment which may affect the combustor design.

The fourth embodiment (Column VI) employs the concept of returning all or part of the waste nitrogen from the air separation unit as a controllable inert coolant to the transition piece and/or the gas turbine expander and returning some of the waste heat from oxygen product compression to the oxidant air saturator. This embodiment also extracts all or part of the compressed air feed to an elevated pressure air separation unit from the discharge of a high pressure, but not necessarily the highest pressure, section in the main gas turbine air compressor. This embodiment, shown earlier in FIG. 7, is best compared with the existing technology of an integrated gasification humid air turbine with a stand alone low pressure air separation unit (Column I). The invention has the benefits of reducing or eliminating the air separation unit main air compressor with an associated capital savings of ~$7,000,000, significantly reducing the size of the oxygen compressor, and increasing the capacity of the plant by 7.0 MW at a slightly higher heat rate. Also, the gas turbine transition piece and/or expander cooling will be accomplished with an independently controlled inert coolant stream instead of the air stream used by most existing technology. This will allow greater flexibility of operation and should also permit a significant increase in firing temperature. The increased efficiency realized with this increased firing temperature was not taken into account in modeling the efficiency and capacity of the plant, so the actual benefits will be greater than those enumerated in the Table 1 data. In addition, no credit was taken for the likelihood that the nitrogen coolant may be delivered to the turbine stages at a lower pressure than the gas turbine air compressor outlet unlike the previous technology of nitrogen return to the fuel stream or combustor disclosed in the background art. Thus, the benefits enumerated in Table 1 are even more conservative. The variation on this embodiment, shown earlier in FIG. 8 also employs the concept of extracting the air feed to the air separation unit from an intermediate or intercooling section of the gas turbine air compressor with the possible addition of a booster compressor to provide the appropriate feed pressure to the air separation unit. In this variation, an additional benefit, depending on the particulars of the intercooling system, is that cooling duty may be shifted to the air separation unit by adjusting the air separation unit air feed withdrawal location relative to the intercooler to provide additional design or operating flexibility. The costs for these improvements are that the gas turbine air compressor may require increased capacity, the gas turbine compressor intercooler and aftercooler may require more area, an additional air expander may be needed for the FIG. 7 embodiment if the high pressure gas turbine air compressor discharge pressure is significantly higher than the air separation unit high pressure air feed, an additional nitrogen compressor is required, and the fuel flow is increased by 4.2% relative to the base case. With the option of sending some of the heat of compression of the integrated air separation unit air feed to the high pressure oxygen feed to the gasifier, the oxygen can be fed to the gasifier at a higher temperature which will improve the gasifier's performance. As before, the trade off for this improvement in gasifier operation is that less heat of compression can be transferred to the oxidant air saturator, but since this improvement transfers heat more directly into the process, the option can produce additional net benefits. With the option of transferring additional heat of compression from the turbine cooling nitrogen to the oxygen stream further benefit may be gained. First, the oxygen can be fed to the gasifier at a higher temperature, improving its performance. In addition, some or all of the turbine cooling nitrogen can be supplied at a lower temperature to either the combustor, transition piece or expander of the gas turbine which can also improve its performance.

A fifth embodiment, unlike the previous embodiments, refers to an integrated gasification combined cycle system and employs the concept of returning some or all of the waste nitrogen from the air separation unit as a controllable inert coolant to the transition piece and/or the gas turbine expander. This embodiment also extracts all or part of the compressed air feed to an elevated pressure air separation unit from the discharge of a high pressure, but not necessarily the highest pressure, section in the main gas turbine air compressor. This embodiment, which is not shown, is best compared with the existing technology of an integrated gasification combined cycle with an integrated elevated pressure air separation unit with nitrogen returned to the combustor fuel stream. The primary benefits and advantages were not modeled quantitatively but result from the gas turbine transition piece and/or expander cooling being accomplished with an independently controlled inert coolant stream instead of the air stream used by existing technology. This independent controllability will allow greater flexibility of operation and most likely will also permit a significant increase in firing temperature. This increased firing temperature will in turn significantly increase both the efficiency and capacity of the plant. In addition, the nitrogen coolant may be delivered to the turbine stages at a much lower pressure than the gas turbine combustor fuel pressure, so the nitrogen compression capital and operating costs also will be significantly lower. The cost for these improvements relative to existing technology is that the NOx suppression may need to be supplemented with steam from the heat recovery steam generator injected into the combustor. With the option of transferring some additional heat of compression from the turbine cooling nitrogen to the oxygen stream, additional benefit may be gained. First, the oxygen can be fed to the gasifier at a higher temperature, improving its performance. In addition, some or all of the turbine cooling nitrogen can be supplied at a lower temperature to either the combustor, transition piece or expander of the gas turbine which can also improve its performance.

In summary, the specific benefits of applying the appropriate combinations of the novel concepts put forward in this invention depend on the specific power generation system under consideration. However, it is clear from the most likely embodiments of the invention disclosed above, that there is significant improvement relative to existing technology in plant capacity, efficiency, operating flexibility, and capital costs.

Finally, in the actual optimal design of an integrated facility, some or all of the air or nitrogen stream integration locations may, in fact, occur within a major equipment item, e.g., air extraction from the gas turbine air compressor may be withdrawn from an intermediate location within the compressor at a pressure less than the final pressure of the discharge pressure of the compressor unit.

The present invention has been described with reference to several specific embodiments thereof. These embodiments should not be seen as a limitation on the present invention. The scope and breath of the present invention should be ascertained from the following claims.

We claim:

1. A process for the generation of electrical power, wherein, in a cryogenic air separation unit, compressed air is distilled into an oxygen product and a waste nitrogen product, wherein at least a portion of the oxygen product is compressed and reacted with a carbonaceous fuel, in a gasifier or padial oxidation unit, to produce a synthesis gas comprising carbon monoxide and hydrogen, wherein feed air is compressed in a gas turbine feed air compressor and subsequently saturated; wherein the synthesis gas is combusted with the saturated, compressed, gas turbine feed air in a combustor to produce a combustion gas, which passes through a transition piece and is then expanded in a gas turbine to generate work, wherein at least a portion of the generated work is used to drive the gas turbine feed air compressor and wherein at least another portion of the generated work is used to generate electricity, characterized by:
 (a) supplying at least a portion of the compressed air to the cryogenic air separation unit by withdrawing a portion of the compressed, gas turbine feed air from the gas turbine feed air compressor; and
 (b) utilizing at least a portion of the heat of compression of the oxygen product to heat water to saturate the compressed, gas turbine feed air.

2. The process of claim 1 further characterized by feeding at least a portion of the waste nitrogen product to an intermediate stage of the gas turbine feed air compressor.

3. The process of claim 1 further characterized by injecting at least a portion of the waste nitrogen product as a controllable inert gas coolant, diluent or mass flow enhancing component into at least one piece of equipment selected from the group consisting of the combustor, the transition piece and the gas turbine.

4. The process of claim 2 further characterized by injecting at least a portion of the waste nitrogen product as a controllable inert gas coolant, diluent or mass flow enhancing component into at least one piece of equipment selected from the group consisting of the combustor, the transition piece and the gas turbine.

5. The process of claim 1 further characterized by utilizing at least a portion of heat inherent to the withdrawn portion of the compressed, gas turbine feed air from the gas turbine feed air compressor being fed to cryogenic air separation unit to warm the portion of the oxygen product fed to the gasifier or partial oxidation unit.

6. The process of claims 2 further characterized by utilizing at least a portion of heat inherent to the withdrawn portion of the compressed, gas turbine feed air from the gas turbine feed air compressor being fed to cryogenic air separation unit to warm the portion of the oxygen product fed to the gasifier or partial oxidation unit.

7. The process of claim 3 further characterized by utilizing at least a portion of heat inherent to the withdrawn portion of the compressed, gas turbine feed air from the gas turbine feed air compressor being fed to cryogenic air separation unit to warm the portion of the oxygen product fed to the gasifier or partial oxidation unit.

8. The process of claim 4 further characterized by utilizing at least a portion of heat inherent to the withdrawn portion of the compressed, gas turbine feed air from the gas turbine feed air compressor being fed to cryogenic air separation unit to warm the portion of the oxygen product fed to the gasifier or partial oxidation unit.

9. The process of claim 1 wherein the withdrawn portion of the compressed, gas turbine feed air from the gas turbine feed air compressor is further compressed in an air separation unit air compressor prior to being fed to the air separation unit for distillation and the heat of compression resulting from the further compression is used to heat water to saturate the compressed, gas turbine feed air.

10. The process of claim 2 wherein the withdrawn portion of the compressed, gas turbine feed air from the gas turbine feed air compressor is further compressed in an air separation unit air compressor prior to being fed to the air separation unit for distillation and the heat of compression resulting from the further compression is used to heat water to saturate the compressed, gas turbine feed air.

11. The process of claim 3 wherein the withdrawn portion of the compressed, gas turbine feed air from the gas turbine feed air compressor is further compressed in an air separation unit air compressor prior to being fed to the air separation unit for distillation and the heat of compression resulting from the further compression is used to heat water to saturate the compressed, gas turbine feed air.

12. The process of claim 4 wherein the withdrawn portion of the compressed, gas turbine feed air from the gas turbine feed air compressor is further compressed in an air separation unit air compressor prior to being fed to the air separation unit for distillation and the heat of compression resulting from the further compression is used to heat water to saturate the compressed, gas turbine feed air.

13. The process of claim 5 wherein the withdrawn portion of the compressed, gas turbine feed air from the gas turbine feed air compressor is further compressed in an air separation unit air compressor prior to being fed to the air separation unit for distillation and the heat of compression resulting from the further compression is used to heat water to saturate the compressed, gas turbine feed air.

14. The process of claim 6 wherein the withdrawn portion of the compressed, gas turbine feed air from the gas turbine feed air compressor is further compressed in an air separation unit air compressor prior to being fed to the air separation unit for distillation and the heat of compression resulting from the further compression is used to heat water to saturate the compressed, gas turbine feed air.

15. The process of claim 7 wherein the withdrawn portion of the compressed, gas turbine feed air from the gas turbine feed air compressor is further compressed in an air separation unit air compressor prior to being fed to the air separation unit for distillation and the heat of compression resulting from the further compression is used to heat water to saturate the compressed, gas turbine feed air.

16. The process of claim 8 wherein the withdrawn portion of the compressed, gas turbine feed air from the gas turbine feed air compressor is further compressed in an air separation unit air compressor prior to being fed to the air separation unit for distillation and the heat of compression resulting from the further compression is used to heat water to saturate the compressed, gas turbine feed air.

17. The process of claims 2, 3 or 4 further characterizing compressing the waste nitrogen product.

18. The process of claim 17 wherein the heat of compression resulting from further compressing the waste nitrogen product is used to heat water to saturate the compressed, gas turbine feed air.

19. The process of claims 1, 2, 3, or 9 wherein the cryogenic air separation unit operates at elevated pressure.

20. The process of claim 19 wherein at least a portion of the waste nitrogen product is reduced in pressure in an expander to generate work.

21. The process of claims 1, 2, 3 or 9 wherein the withdrawn portion of the compressed, gas turbine feed air from the gas turbine feed air compressor is expanded in an expander to generate work prior to being fed to the air separation unit for distillation.

* * * * *

UNITED STATES PATENT AND TRADEMARK OFFICE
CERTIFICATE OF CORRECTION

PATENT NO. : 5,406,786
DATED : 18 April 1995
INVENTOR(S) : Eric William Scharpf, et al.

It is certified that error appears in the above-identified patent and that said Letters Patent is hereby corrected as shown below:

Column 16, Line 59
    Delete "padial" and substitute therefor -- partial --

Signed and Sealed this

Twentieth Day of June, 1995

Attest:

BRUCE LEHMAN

*Attesting Officer*    *Commissioner of Patents and Trademarks*